United States Patent [19]

Campbell

[11] 4,057,479

[45] Nov. 8, 1977

[54] SOLID POLYMER ELECTROLYTE CELL CONSTRUCTION

[75] Inventor: Barrie C. Campbell, Provo, Utah

[73] Assignee: Billings Energy Research Corporation, Provo, Utah

[21] Appl. No.: 661,789

[22] Filed: Feb. 26, 1976

[51] Int. Cl.$^2$ ............................ C25B 1/02; C25B 9/00
[52] U.S. Cl. ..................... 204/258; 204/266; 204/270; 204/282; 204/289
[58] Field of Search ............... 204/252, 253, 255, 256, 204/257, 258, 263, 266, 269, 282, 283, 284, 290 R, 289, 270

[56] References Cited

U.S. PATENT DOCUMENTS

| | | | |
|---|---|---|---|
| 548,162 | 10/1895 | Hargreaves & Bird | 204/283 |
| 1,152,772 | 9/1915 | Wheeler | 204/283 |
| 3,312,614 | 4/1967 | Shick | 204/266 |
| 3,446,725 | 5/1969 | Spengler et al. | 204/283 X |
| 3,553,092 | 1/1971 | Mund et al. | 204/301 |
| 3,855,104 | 12/1974 | Messner | 204/256 X |
| 3,981,745 | 9/1976 | Stedman | 204/266 |

*Primary Examiner*—Arthur C. Prescott
*Attorney, Agent, or Firm*—Criddle, Thorpe & Western

[57] ABSTRACT

A solid polymer electrolyte cell includes a solid polymer electrolyte membrane, an anode disposed on one side of and in contact with the membrane wherein the anode includes a substrate coated with lead dioxide and formed with one or more grooves therein, a cathode including a body of sintered nickel disposed on the other side of and in contact with the membrane, and a support structure corrugated on a surface portion thereof with such surface portion being in contact with the body of sintered nickel to maintain the body in contact with the membrane. With this construction, water may be supplied to the grooves in the anode to ultimately cause a reaction at the interface of the membrane and the cathode to product hydrogen gas.

8 Claims, 2 Drawing Figures

SOLID POLYMER ELECTROLYTE CELL CONSTRUCTION

BACKGROUND OF THE INVENTION

This invention relates to a solid polymer electrolyte cell arrangement.

As a result of recent shortages in hydrocarbon fuels and the recognition that the supply of such fuels will ultimately be exhausted, there has naturally been an increased interest in finding and developing alternative fuels. Hydrogen, being one of the most abundant of all elements and being relatively pollution free when burned, is considered one of the more attractive alternatives to hydrocarbon fuels, and electrolysis is considered one of the more attractive and economically feasible methods of producing hydrogen.

Prior art electrolytic cells have typically included a container of some type for holding a liquid electrolyte and a pair of electrodes immersed in the electrolyte. Application of direct current across the electrodes produces an electrochemical reaction in which the electrolyte is decomposed into one or more gas products. For example, with an aqueous electrolyte, oxygen and hydrogen may be produced.

Because of the inefficiencies, portability drawbacks, and maintenance requirements of the liquid electrolyte cells, considerable interest has centered on a fairly new technology involving solid polymer electrolytes (SPE). See, for example, "Solid Electrolytes Offer Route to Hydrogen", Chemical and Engineering News, Aug. 27, 1973; "Electrolytic Hydrogen Fuel Production with Solid Polymer Electrolyte Technology" by W. A. Titterinton and A. P. Fickett, VIII IECEC Proceedings; and "A Hydrogen-Energy System", published by American Gas Association, 1973. As described in these references, SPE is typically a solid plastic sheet of perfluorinated sulfonic acid polymer which, when saturated with water, becomes an excellent ionic conductor. The ionic conductivity results from the mobility of the hydrated hydrogen ions which move through the polymer sheet by passing from one sulfonic acid group to another. An anode and cathode are positioned on either side of the sheet and pressed thereagainst to form the desired SPE cell.

Hydrogen is produced by the SPE cell by supplying water to the anode where it is electrochemically decomposed to provide oxygen, hydrogen ions, and electrons. The hydrogen ions move through the SPE sheet to the cathode while the electrons pass through the external circuit. At the cathode, the hydrogen ions and the electrons recombine electrochemically to produce hydrogen gas.

Although the prior art SPE cell described provides a reliability and efficiency not achieved with the liquid electrolyte cell, the cell still requires noble metal catalysts and this is quite costly. In addition, cell breakdown is more frequent than is desirable.

SUMMARY OF THE INVENTION

It is an object of the present invention to provide a new and less costly SPE cell especially adapted for use in producing hydrogen.

It is another object of the present invention to provide such a cell in which at least one electrode of the cell is constructed of a body of sintered material.

It is still another object of the present invention, in accordance with one aspect thereof, to provide such a cell having one electrode composed of a substrate coated with lead dioxide and another electrode composed of a body of sintered nickel.

The above and other objects of the present invention are realized in a SPE cell having a solid polymer electrolyte membrane, a first electrode disposed on one side of and in contact with the membrane wherein the electrode is formed to enable the flow of fluid between the electrode and membrane, and a second electrode formed into a body of sintered material adapted to enable the flow of fluid through the material and disposed on the other side of and in contact with the membrane. The body of sintered material may either be held in place against the membrane by a support structure disposed in contact with the body or be laminated together with the membrane. In one specific embodiment of the invention, a first electrode includes a substrate having one or more grooves formed therein with the grooved portion being coated with lead dioxide, and a second electrode includes a body of sintered nickel. The lead dioxide electrode provides an effective catalyst for the decomposition of water at the electrode/membrane interface. Provision of the sintered body electrode facilitates good contact between the electrode and the solid polymer electrolyte membrane and yet allows hydrogen to escape from the interface of the electrode and membrane.

BRIEF DESCRIPTION OF THE DRAWINGS

The above and other objects, features and advantages of the present invention will become apparent from the following detailed description presented in connection with the accompanying drawings in which.

DETAILED DESCRIPTION

Figure 1:
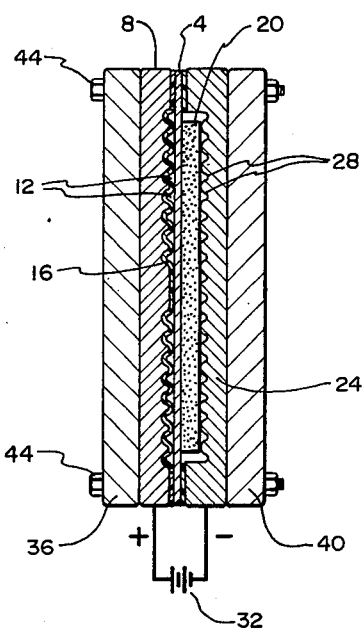
FIG. 1 shows an end, cross-sectional view of a solid polymer electrolyte cell made in accordance with the principles of the present invention.

FIG. 1 shows an end, cross-sectional view of a solid polymer electrolyte cell which includes a solid polymer electrolyte membrane 4, advantageously composed of a perfluorosulfonic acid polymer produced by Du Pont and known as "nafion". The "nafion" membrane is described in an article entitled "'Nafion', an Electrochemical Traffic Controller", by Daniel J. Vaughan, published in Du Pont Innovation, Vol. 4, No. 3, Spring, 1973.

Disposed on one side of and in contact with the membrane 4 is a substrate 8, one side of which includes a plurality of grooves 12. The grooves are formed on the side of the substrate 8 which is placed in contact with the membrane 4. The grooved side of the substrate 8 is coated with a layer of lead dioxide 16 which serves as the anode of the cell. Substrates coated with lead dioxide for use as anodes are produced by Pacific Engineering and Production Company of Nevada and Sanwa Chemical Company Ltd. of Tokyo, Japan. The processes for producing the lead dioxide anodes are apparently proprietary but the products made by the processes are commercially available. Of course, other types of anodic material could be used in the cell construction of FIG. 1.

Disposed on the other side of the membrane 4 and maintained in contact therewith is a body of sintered nickel 20. It has been found that sintered nickel having a porosity of from 10 microns to 100 microns functions suitably and porosities greater or lesser than this range may also operate respectably. With such porosity, water and gases may readily flow through the cathode body and yet good surface contact may be maintained between the cathode body and the membrane 4. A support structure 24 is positioned on the side of the cathode body 20 which is not in contact with the membrane 4 to force the cathode against the membrane. This structure may be composed of any electrically conductive material and is provided with corrugations or grooves 28 on the side thereof which is in contact with the cathode. Provision of the corrugations facilitates the flow of water and hydrogen gas from the cell as will be discussed further momentarily.

A battery or other direct current source 32 is coupled to the substrate 8 and to the support structure 24 to thereby provide current to the lead dioxide anode 16 and to the sintered nickel cathode 20.

The membrane 4, substrate 8, sintered nickel body 20 and support structure 24 are held in place by a pair of end plates 36 and 40 which, in turn, are held together by bolts and nuts 44. The end plates 36 and 40 and bolts and nuts 44 are insulated from the membrane 4, substrate 8, sintered nickel body 20 and support structure 24. Of course, a variety of arrangements could be employed to maintain the cell in the configuration shown in FIG. 1.

Figure 2:
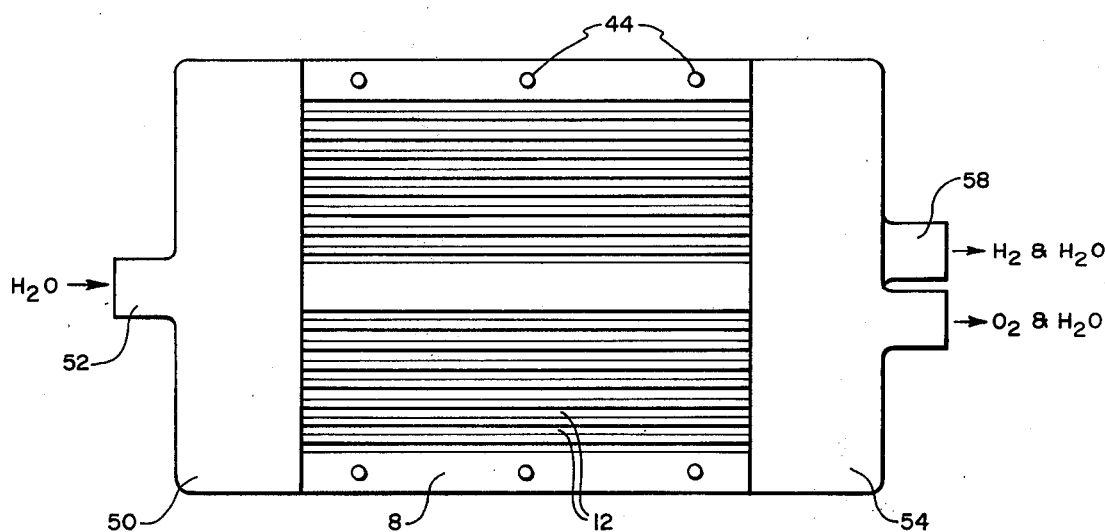
FIG. 2 shows a schematic side view of the cell of FIG. 1.

FIG. 2 schematically shows a side view of the electrolyte cell of FIG. 1. The pattern of the grooves 12 of the substrate 8 are shown to be linear and to extend in a parallel relationship on the substrate between a pair of manifolds 50 and 54. Manifold 50 is coupled over one end of the cell to communicate with the grooves 12 formed in the substrate 8. Water is applied to a nozzle 52 of the manifold 50 which then guides the water to the grooves 12 to flow toward the manifold 54. The manifold 54 is coupled over the other end of the cell to also communicate with the grooves 12 and to collect water and oxygen which is produced at the anode/membrane 4 interface. Another manifold 58 is coupled over one end of the cell to communicate with the grooves 28 (not shown in FIG. 2) and to collect water and hydrogen which is produced at the cathode/membrane 4 interface. Specific arrangements for applying water to electrolyte cells and for collecting water and gas products produced in such cells are described in greater detail in copending application Ser. No. 661,788, filed Feb. 26, 1976. The specific manner of applying water to the cell and collecting products produced thereby is not of concern in this application.

Although the body of sintered nickel 20 is shown in FIG. 1 and described as being held in contact with the membrane 4 by a support structure 24, an alternative arrangement would be to laminate the sintered nickel body directly onto the membrane. Then, the support structure 24 of FIG. 1 would be unnecessary other than perhaps to guide the flow of water and hydrogen gas as hereafter described. Sintered nickel may be laminated onto a "nafion" membrane simply by placing the membrane in contact with a body of sintered nickel in a high temperature press, and then heating the press to about 200° C and applying a pressure of about 800 lbs/in.$^2$ for roughly three minutes. The press is then cooled to room temperature while the pressure is maintained and this completes the process. Gasketing may be used to prevent dehydration of the membrane at the laminating temperatures. With the process described, a sintered nickel cathode may be securely laminated to the membrane to provide a simple cell construction.

When water is applied to the grooves 12 and a direct current to the anode and cathode, hydronium ions $H_3O+$ are formed at the anode/membrane interface (as is oxygen gas) and these hydronium ions are transported through the membrane by passing among sulfonic acid groups. When the hydronium ions reach the cathode, they combine with free electrons supplied by the cathode to produce water and hydrogen gas. The hydrogen gas so produced may then be collected for subsequent use.

The electrolyte cell construction described provides an inexpensive and yet reliable, and long-lived electrolysis apparatus. The use of sintered nickel as the cathode especially facilitates the production and collection of hydrogen gas.

It is to be understood that the above-described arrangement is only illustrative of the application of the principles of the present invention. Numerous other modifications and alternative arrangements may be devised by those skilled in the art without departing from the spirit and scope of the present invention and the appended claims are intended to cover such modifications and arrangements.

What is claimed is:
1. A solid polymer electrolyte cell comprising
   a solid polymer electrolyte membrane,
   an anode disposed on one side of and in contact with said membrane, said anode including a substrate coated with lead dioxide and being formed to enable the flow of fluid between the anode and membrane, with the lead dioxide being maintained in contact with the membrane, and
   a cathode formed of a body of sintered material adapted to enable the flow of fluid therethrough and disposed on the other side of and in contact with said membrane.
2. A cell as in claim 1 wherein said body of sintered material is laminated onto said membrane.
3. A cell as in claim 1 further comprising
   a support structure disposed in contact with said body of sintered material to maintain the body in contact with the membrane, the surface area of the support structure which is in contact with said body being corrugated.
4. A cell as in claim 1 wherein said anode is formed with one or more grooves therein facing the membrane, the grooved bottoms being spaced from the membrane to thereby enable the conveyance of fluid through the grooves.
5. A cell as in claim 1 wherein said cathode is comprised of a body of sintered nickel.
6. A cell as in claim 1 wherein said substrate is composed of graphite.
7. A cell as in claim 1 wherein said membrane is a perfluorosulfonic acid membrane.
8. A cell as in claim 1 further comprising
   means for applying water to the grooves in the anode to flow therethrough
   means for applying a D.C. current to the cathode and anode, and
   means for collecting the products produced at the interface of the membrane and cathode.

* * * * *